April 6, 1965   D. O. APPLEBY   3,176,331
HIGH SPEED CARBIDE CHASER SET

Filed Nov. 1, 1962   3 Sheets-Sheet 1

INVENTOR.
Donald O. Appleby,
BY John H. Leonard
his ATTORNEY.

April 6, 1965     D. O. APPLEBY     3,176,331
HIGH SPEED CARBIDE CHASER SET

Filed Nov. 1, 1962     3 Sheets-Sheet 2

INVENTOR.
Donald O. Appleby,
BY John H. Leonard,
his ATTORNEY

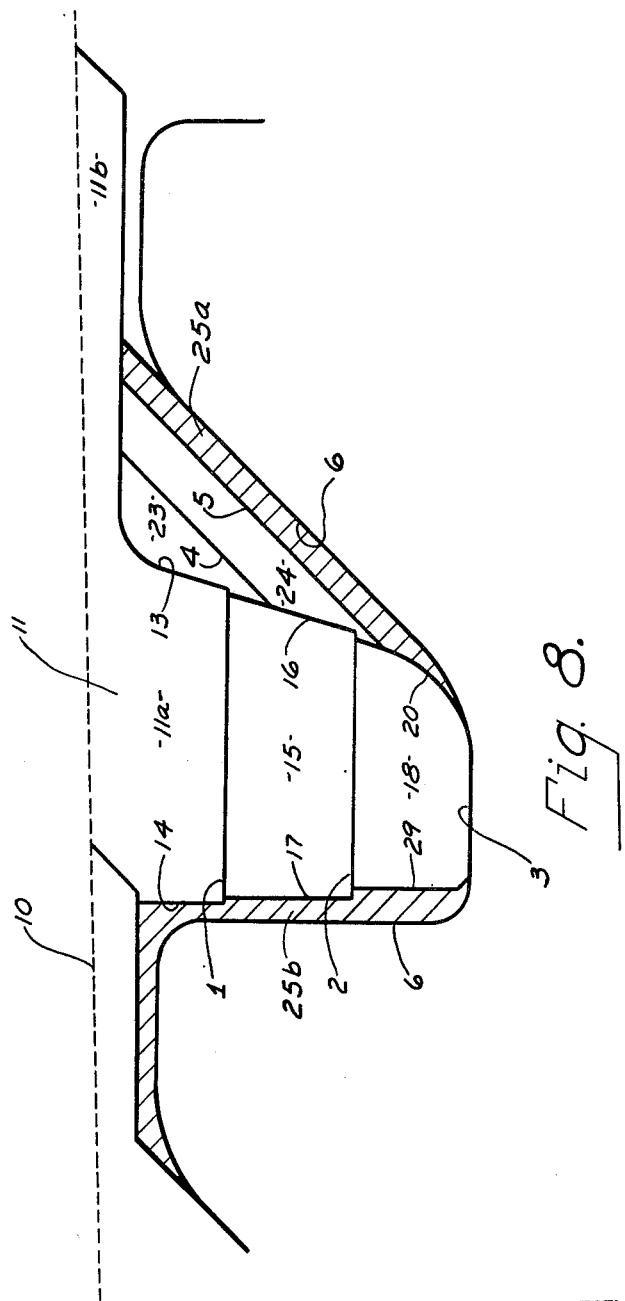

United States Patent Office 3,176,331
Patented Apr. 6, 1965

3,176,331
HIGH SPEED CARBIDE CHASER SET
Donald O. Appleby, Mentor, Ohio, assignor to The Pipe Machinery Company, Wickliffe, Ohio, a corporation of Ohio
Filed Nov. 1, 1962, Ser. No. 234,751
3 Claims. (Cl. 10—120)

This invention relates to thread cutting chasers and particularly to a set of carbide chasers for the high speed cutting of threads on pipes and the like.

For the purposes of illustration, the invention is disclosed as applied to chasers for cutting external tapered threads, their use for cutting internal threads being readily apparent from the illustrative example.

The present invention is an improvement on the chasers described in my copending application, Serial No. 234,-753, filed November 1, 1962, and entitled Set of High Speed Thread Cutting Carbide Chasers, and the copending application of Scott and Appleby, Serial No. 234,752, filed November 1, 1962, and entitled Set of High Speed Carbide Chasers.

In the threading of pipes, it is a conventional practice to provide a set of chasers of which the teeth in succession make cuts beginning at the central portion of which is to become the troughs or valleys between adjacent thread flanks, the cuts being progressively deeper and each tooth cutting at the root and both flanks of the cut made by the preceding tooth. Thus all the cuts had uninterrupted shear lines extending from the surface of the stock, along one flank of the cut, across the root, and up the other flank to the surface of the stock. This type of cutting is subject to a number of disadvantages, the principal one of which is that the chips being cut from both flanks and the root, concurrently, are in such quantity that they tend to fill the free space in front of the tooth and "ball up" or "load up" centrally of the forward face of the cutting tooth. Furthermore, the shear line progressively increases in length, so that the tooth for the last cut, and the teeth for those cuts immediately preceding the last, have very long cutting edges imposing heavy loads. It is difficult to make these teeth sufficiently rugged to withstand the cutting forces for long periods, to conduct away effectively the heat produced in cutting, and to withstand the additional forces imposed by the severe chip load.

One attempt to overcome this objection was to provide cuts along one flank and the root, the cuts alternating as to flanks after one central cut, so that each cut was along one flank only and entirely across the root, and the next cut was along the other flank and entirely across the root. This alternate cutting was continued until the thread was completed. While this reduced the chip load to some degree, the problem remained serious.

The need for removal of chips is twofold. First, they impose a severe drag on the cut surfaces exposed by the preceding tooth, thus greatly increasing power requirements. Further, they interfere with the access of coolant to the tooth adjacent the cut and instead dissipate a large amount of the coolant heat absorbing capacity by cooling chips already cut free of the metal and spaced from the cutting edge of the tool. Also, they often load the cutting throat and teeth to such a degree that the threading head has to be stopped, and the chips cleaned out by hand before further cutting can be effected.

The next attempt was to employ three chasers of three teeth each, and proceed to cut by a number of successive central cuts, each with its flank ends inset from the cut preceding it. These central cuts were followed by a series of interrupted flank cuts which extended along the flanks and slightly inwardly toward the center at the root of the cut, leaving the final cut to one tooth which made an interrupted cut from one crest of the finished thread along one flank, across the root, and along the other flank to the adjacent crest of the thread. This improved the operation except that the last cut imposed an extremely heavy chip load and heavy drag, which frequently fractured the last tooth and imposed power requirements which were high but not as high as theretofore.

Next an attempt was made to overcome its disadvantages by a set of chasers such as described in the above joint application of Scott and Appleby, wherein three central plunging cuts are made, each plunging so deeply that the third cut was entirely to the finished root line of the thread. This third central cut was followed by two flank cuts which were continuous along the forward flank and rear flank extending substantially from one crest of the thread to the next adjacent crest. While this was satisfactory in some respects it had an objectional feature in that the teeth of the central plunging cuts were so arranged that the forward flanks of the plunging cuts defined a continuous surface. Consequently, the second tooth scraped the surface already formed by the first tooth, and the third tooth scraped the continuous flank surface already formed by the first and second teeth. This was found to be damaging to the tool, tending to cause undue heating and dulling. However, breaking was greatly reduced, in order to overcome the difficulties encountered with the chasers of the above joint application, the set of chasers of the present invention is provided and has proven very satisfactory.

The present invention is shown for illustration as a set of three chasers of two teeth each. The teeth operate in succession so as to provide three central cuts, followed in turn by two cuts on the forward flank, and finally an interrupted cut extending from one crest of the thread along one flank and adjacent parts of the root, and along opposite flank and adjacent crest of the thread, as in the above joint application. The specific arrangement of the cuts for accomplishing this end, while overcoming the objections to the chasers of the joint application, will become apparent from the following description wherein reference is made to the drawings, in which:

FIG. 8 is an enlarged diagrammatic illustration showing the successive cuts made by the chasers illustrated in FIGS. 2 through 7.

For purposes of illustration, the chasers are shown with tooth profiles for cutting an external butt thread having a 45° forward flank angle and a 0° rear flank angle, their application to other external thread profiles having wide crests and roots, as distinguished from conventional V-shape threads, being apparent from the illustrative example.

Figure 1:
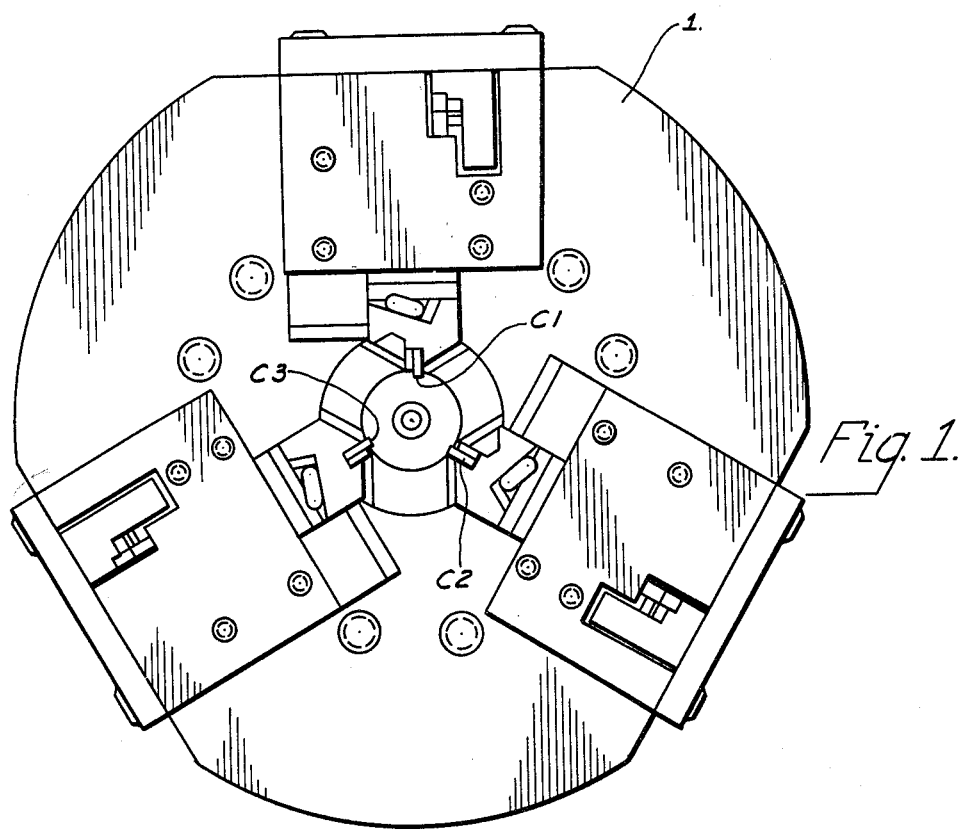
FIG. 1 is a front elevation of the rotary spindle head with a set of chasers embodying the present invention mounted therein for concurrent rotation about a common axis.
Figure 3:
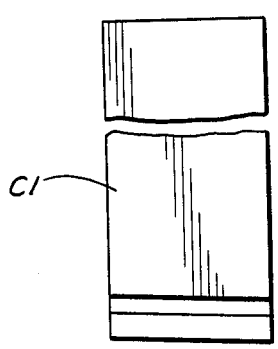
FIGS. 2 and 3 are a front elevation and left end elevation, respectively, of one of the chasers of the set.
Figure 2:
Figure 5:
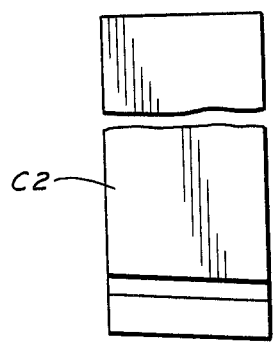
FIGS. 4 and 5 are a front elevation and left end elevation, respectively, of the second one of the chasers of the set.
Figure 4:
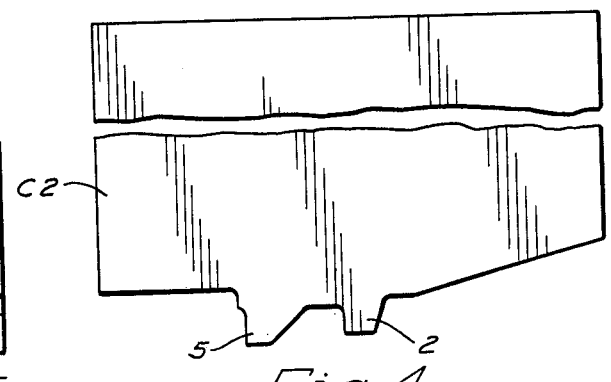
Figure 7:
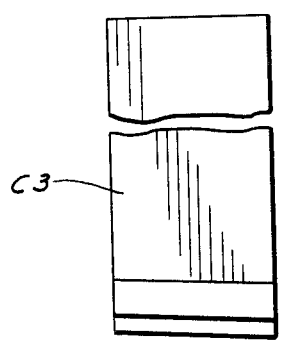
FIGS. 6 and 7 are a front elevation and left end elevation, respectively, of the third chaser of the set.
Figure 6:
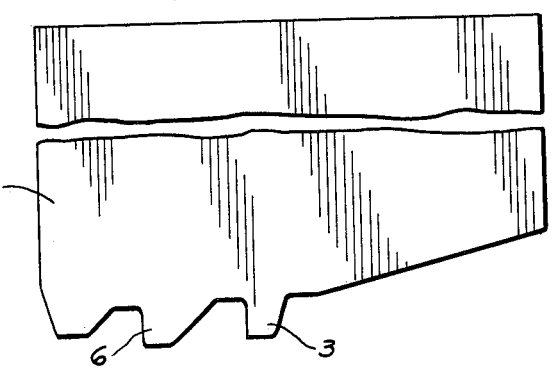

Referring first to FIG. 1, the chasers are shown as mounted in a rotary spindle head 1 for cutting tapered external threads, their use for cutting cylindrical external threads and for tapping being apparent from the illustrative example. The head may be of the type disclosed in United States Letters Patent No. 3,082,446, issued to William L. Benninghoff, on March 26, 1963, and entitled Taper Thread Cutting Die Head With Radially Removable Wedge Elements for Controlling the Chasers, and No. 2,996,736, issued to William L. Benninghoff on August 22, 1961, and entitled Automatic Taper Thread Forming and Chamfer Cutting Machine.

Referring to FIGS. 2 through 7, the three chasers, indicated at $C_1$, $C_2$, and $C_3$, respectively, have a total of six teeth which, in their order of cutting, are indicated at 1 through 6, respectively. The teeth are distributed so that chaser $C_1$ has teeth 1 and 4, chaser $C_2$ has teeth 2 and 5, and chaser $C_3$ has teeth 3 and 6.

The chasers may be otherwise in the conventional form comprising a flat block of carbide of rectangular pattern with the teeth at one edge. These blocks, as described in the above entitled patent, are mounted in suitable carriers in a rotary spindle so that they can be rotated concurrently about a common axis for cutting threads, and concurrently retracted from the axis if cutting of tapered threads is desired.

Referring to FIG. 8, the tooth 1 makes a first central cut from the outer surface of the pipe, indicated by the dotted line 10, to a considerable depth below the outer surface. This first cut, indicated at 11, has a deep central portion 11a and an end portion 11b which is shallow and elongated in the direction of lead. The central portion 11a has end surfaces 13 and 14 which are spaced inwardly from the finish flank lines of the thread. Though the cut 11, made by the tooth 1, is a heavy cut, it is only a central cut, so that the amount of chips produced can readily be handled in the available throat space. Also the tooth is of limited radial extent so that it can readily withstand the forces imposed. The next cut is made by tooth 2, as indicated at 15, this cut having end surfaces 16 and 17, respectively, at the front and rear flanks. It is desirable that tooth 2 does not touch any surface already formed by the tooth 1 and for this reason not only is the end surface 17 stepped forwardly from the rear flank beyond end surface 14 of the cut 11, but also the end surface 16, at the forward flank, is stepped rearwardly from the forward flank from the end surface 13. The cut 15 is relatively deep, being about the same depth as cut 11. However, since there are no flanking cuts, ample chip space is provided and the chips can be flushed out readily.

The third cut, indicated at 18, is made by tooth 3. It is seen that the cuts 11, 15 and 18 are plunging cuts and the cut 18 goes to the root line of the thread and cuts a major portion of the root. The cut 18 has its end 20 stepped rearwardly from the forward flank from the end suface 16, and its end surface 29 stepped forwardly from the rear flank from the end surface 17. Thus the end surfaces of the plunging central cuts are in stepped relation at each flank so that no flank cut made by one tooth is rubbed by a succeeding tooth.

The fourth cut is a flank cut 23 made by the tooth 4. This cut has a continuous shear line and is along the forward flank. The next cut 24 is a forward flank cut made by tooth 5.

The sixth and final cut is made by tooth 6. It is an interrupted flank cut comprising two portions 25a and 25b. The cut portion 25a extends along the entire forward flank and a small portion of the root, and is a finish cut. The portion 25b extends from the crest of the thread down along the rear flank, and at its lower end forms a very small portion of the root. The tooth does not engage any surface already cut. Though a large amount of metal is thus removed, along both flanks, the space between the banks is very wide and hence the tooth can be made very rigid. Furthermore, ample space is provided at the central portion of the forward face of the tooth, between the portions 25a and 25b to readily accommodate all of the chips that are formed. As a result of this stepping relation of the original central plunging cuts at the front flank as well as the rear flank, no cut surface originally exposed by one tooth is scraped or rubbed by another. Instead each tooth takes a deep positive cut of its own.

With chasers making cuts in the sequence described, higher cutting speeds can be used than heretofore. The loading up or packing of chips in front of the chasers is eliminated, horsepower requirements are reduced, and the life of the tool is increased. The finish thread surfaces are unmarred by chips and are not rubbed or scraped by the chips or teeth.

The chasers are designed to cut threads having wide roots and crests, as distinguished from conventional V-shaped threads and the recitation in the claims that the teeth have wide roots and crests is intended to exclude conventional V-shape threads.

Having thus described my invention, I claim:

1. A set of thread cutting chasers, said set consisting of three high speed carbide chasers each with two teeth only, said chasers being adapted to be mounted in a rotary spindle head in radially and circumferentially spaced relation to each other about the axis of rotation of the head for co-rotation of the chasers by the head about said axis and for concurrent advancement and retraction of the chasers relative to the axis for cutting on a cylindrical member, coaxial with the spindle head, an external wide crest, wide root tapered thread, said chasers having their teeth shaped and arranged in the order of cutting as follows:

1st, 2nd and 3rd teeth, said 1st tooth having a leading portion and a trailing portion, the said trailing portion, the 2nd tooth, and the 3rd tooth being of progressively greater height, radially of the axis, in the order enumerated, the 2nd tooth being approximately twice the height of said trailing portion of the 1st tooth and the 3rd tooth being approximately three times the height of the trailing portion of the 1st tooth, the 3rd tooth being adapted to cut a portion of the finished root of the thread, said trailing portion and the 2nd and 3rd teeth being of progressively less length endwise of the axis, the flanks of said trailing portion of the 1st tooth being inset from the corresponding finished flank lines of the thread, the flanks of the 2nd tooth being inset from the corresponding flanks, respectively, of said trailing portion of the 1st tooth, the flanks of the 3rd tooth being inset from the corresponding flanks, respectively, of the 2nd tooth, whereby said teeth make successive 1st, 2nd, and 3rd plunging cuts, a 4th tooth of height greater than said trailing portion of the 1st tooth and less than that of the 2nd tooth and having a leading flank sloping from its crest in the leading direction to said leading portion of the 1st tooth and intersecting the leading flank line of the 2nd tooth, for making a first flank cut on the trailing flank of the thread, a 5th tooth of height greater than the 4th tooth and less than that of the 3rd tooth and having a leading flank sloping from its crest, in the leading direction, to said leading portion of the first tooth and intersecting the leading flank line of the 3rd tooth, for making a second flank cut on the trailing flank of the thread, a 6th tooth of substantially the same height as the 3rd tooth and having leading and trailing flanks outset endwise of the axis from the corresponding flanks of said trailing portion of the 1st tooth and from the corresponding flanks of the 2nd through 5th teeth and conforming to the finished trailing and leading flanks, respectively, of the finished thread, said 6th tooth having a trailing portion extending, in the trailing direction, from the lowest point on its rear flank predominantly endwise of the axis and forming with its rear flank a continuous cutting edge conforming to the finished leading flank and crest of the thread, and said leading portion of the 1st tooth extending from the lowest point on the leading flank of the trailing portion of the first tooth in the leading direction generally endwise of the axis and forming with the leading flank of said trailing portion a continuous cutting edge extending in the leading direction beyond the leading flank of the 6th tooth and being of a height less than the height of said trailing portion of the 6th tooth, so that the 3rd tooth makes a finish cut on the thread trough and the 6th tooth makes the finish cuts on both flank and the remainder of the thread.

2. A structure according to claim 1 wherein the crest of the 3rd tooth conforms to at least the major portion of the root of the thread.

3. A set of chasers according to claim 1 wherein the rear flank of the 6th tooth continues uninterruptedly over the entire crest of the trailing tooth adjacent the rear flank and conforms in shape to the finished leading flank and crest of the trailing thread.

References Cited by the Examiner
UNITED STATES PATENTS

| | | | |
|---|---|---|---|
| 1,610,087 | 12/26 | Hanson | 10—141 |
| 1,725,233 | 8/29 | Walker et al. | 10—141 |
| 3,093,850 | 6/53 | Kelso | 10—111 |

FOREIGN PATENTS 252,618  6/26  Great Britain.

ANDREW R. JUHASZ, *Primary Examiner.*

WILLIAM W. DYER, Jr., *Examiner.*